(12) United States Patent
Pathirage et al.

(10) Patent No.: US 9,389,685 B1
(45) Date of Patent: Jul. 12, 2016

(54) VISION BASED BRAIN-COMPUTER INTERFACE SYSTEMS FOR PERFORMING ACTIVITIES OF DAILY LIVING

(71) Applicants: Indika Upashantha Pathirage, Tampa, FL (US); Redwan Alqasemi, Wesley Chapel, FL (US); Rajiv Dubey, Tampa, FL (US); Karan Khokar, Tampa, FL (US); Elijah Anderson Klay, Tampa, FL (US)

(72) Inventors: Indika Upashantha Pathirage, Tampa, FL (US); Redwan Alqasemi, Wesley Chapel, FL (US); Rajiv Dubey, Tampa, FL (US); Karan Khokar, Tampa, FL (US); Elijah Anderson Klay, Tampa, FL (US)

(73) Assignee: University of South Florida, Tamp, FL (US)

( * ) Notice: Subject to any disclaimer, the term of this patent is extended or adjusted under 35 U.S.C. 154(b) by 14 days.

(21) Appl. No.: 14/324,812

(22) Filed: Jul. 7, 2014

Related U.S. Application Data

(60) Provisional application No. 61/843,817, filed on Jul. 8, 2013.

(51) Int. Cl.
*G06F 3/01* (2006.01)
*H04N 13/02* (2006.01)
*H04N 5/225* (2006.01)
*G06T 7/00* (2006.01)

(52) U.S. Cl.
CPC .............. *G06F 3/015* (2013.01); *G06T 7/0081* (2013.01); *H04N 5/225* (2013.01); *H04N 13/0203* (2013.01)

(58) Field of Classification Search
CPC .. G06F 3/04847; G06F 3/013; H04N 13/0018
See application file for complete search history.

(56) References Cited

U.S. PATENT DOCUMENTS

| 4,926,969 | A | 5/1990 | Wright et al. |
|---|---|---|---|
| 5,967,996 | A | 10/1999 | Kadota et al. |
| 7,120,486 | B2 | 10/2006 | Leuthardt et al. |
| 2011/0152710 | A1 | 6/2011 | Kim et al. |
| 2012/0059273 | A1 | 3/2012 | Meggiolaro et al. |
| 2012/0226185 | A1 | 9/2012 | Chung et al. |
| 2012/0245713 | A1 | 9/2012 | Chen et al. |
| 2013/0096453 | A1* | 4/2013 | Chung ................ G06F 3/04847 600/544 |

(Continued)

FOREIGN PATENT DOCUMENTS

| EP | 0632421 | 6/1994 |
|---|---|---|
| EP | 1691682 | 10/2006 |

(Continued)

OTHER PUBLICATIONS

Bell, C.J.; Shenoy, P.; Chalodhorn, R.; Rao, R.P.N.; , "An Image-based Brain-Computer Interface Using the P3 Response," Neural Engineering, 2007. CNE '07. 3rd International IEEE/EMBS Conference on , vol., no., pp. 318-321, May 2-5, 2007, doi: 10.1109/CNE. 2007.389675.

(Continued)

*Primary Examiner* — Gerald Johnson
(74) *Attorney, Agent, or Firm* — Thomas | Horstemeyer, LLP (57) ABSTRACT

In one embodiment, assisting a user in performing an action in relation to an object of interest includes capturing an image of an environment, identifying boundaries of objects within the image, adaptively dividing the image into selectable cells so that edges of the cells generally aligning with boundaries of objects within the image, and detecting selection of one of the cells by the user, the cell encompassing at least part of the object of interest upon which the user wishes an action to be performed.

20 Claims, 8 Drawing Sheets

(56) References Cited

U.S. PATENT DOCUMENTS

| | | | |
|---|---|---|---|
| 2013/0129191 A1* | 5/2013 | Jin | H04N 13/0018 382/154 |
| 2014/0184550 A1* | 7/2014 | Hennessey | G06F 3/013 345/173 |

FOREIGN PATENT DOCUMENTS

| | | |
|---|---|---|
| EP | 2210160 | 7/2010 |
| EP | 2552304 | 2/2013 |
| WO | 2005060827 | 7/2005 |
| WO | 2009004325 | 1/2009 |
| WO | 2011123059 | 10/2011 |
| WO | 2012013535 | 2/2012 |

OTHER PUBLICATIONS

Hoffmanna, et al., "An Efficient P300-Based Brain-Computer Interface for Disabled Subject," J. Neurosci Methods, Jan. 15, 2008, 167(1):115-25, Epub Mar. 13, 2007.

Donchin, et al., "The Mental Prosthesis: Assessing the Speed of a P300-Based Brain-Computer Interface," IEEE Transactions on Rehabilitation Engineering, vol. 8, No. 2, Jun. 2000, pp. 174-179.

Yuksel, et al., "A Novel Brain-Computer Interface Using a Multi-Touch Surface", CHI 2010: Brains and Brawn, Apr. 10-15, 2010, Atlanta, GA, pp. 855-858.

\* cited by examiner

VISION BASED BRAIN-COMPUTER INTERFACE SYSTEMS FOR PERFORMING ACTIVITIES OF DAILY LIVING

CROSS-REFERENCE TO RELATED APPLICATION(S)

This application claims priority to U.S. Provisional Application Ser. No. 61/843,817, filed Jul. 8, 2013, which is hereby incorporated by reference herein in its entirety.

NOTICE OF GOVERNMENT-SPONSORED RESEARCH

This invention was made with Government support under grant/contract number U.S. Pat. No. 0,713,560, awarded by the National Science Foundation. The Government has certain rights in the invention.

BACKGROUND

According to the 2010 census data report, 19.2 million Americans suffer from some form of disability and are unable to perform typical activities of daily living (ADL) independently or without the aid of a human helper. Many of these people have tetraplegia or are partially paralytic. Some suffer from a brainstem stroke or amyotrophic lateral sclerosis (ALS). In many cases, the person eventually becomes completely locked-in and is unable to move any muscle in his or her body.

A brain-computer interface (BCI) driving a robotic system can enable such persons to carry out their ADLs by simply focusing their attention on a screen displaying a task workspace and the stimuli for an activity they can choose. This generates signals in the brain that can be analyzed and processed by a BCI system. As a result, the BCI system can detect human intention and command a robot to execute a task without the need for the human to move any muscles. In one such system, discrete movements of a robotic arm can be controlled using such brain signals. Unfortunately, the process of moving the arm using a BCI system, for example, to grasp an object, can be quite slow. For example, it may take 20-30 seconds to detect each user command using a BCI system and many such commands may be necessary to manipulate the arm as needed. In addition to being inefficient, this process requires great effort from the user and can cause undue fatigue.

From the above discussion it can be appreciated that it would be desirable to have a BCI system that requires fewer user commands to perform a given action.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have a brain-computer interface (BCI) system that requires fewer commands from a disabled user to perform a given action. For example, it would be desirable to have a BCI system with which a relatively small number of detected user commands can be used to control an automated component, such as a motorized wheelchair and/or a robotic arm, to perform a desired task on an identified object. Disclosed herein are example embodiments of BCI systems that are capable of such functionality. In one embodiment, a BCI system presents the user with an image of a scene that includes an object upon which the user wishes an action to be performed. The image is adaptively divided into multiple non-uniform cells that coincide with objects in the image. The cells can be randomly highlighted while the user gazes upon the image. The user concentrates on the cell within which the object lies and the BCI system identifies the cell from the user's brain response. In cases in which the center of a cell does not overlie the object of interest, in which case it is not clear which object within the cell the user wishes to select, the user can input a zoom command that causes the system to zoom in on the cell and adaptively divide the zoomed image into a new group of non-uniform cells. Such zooming can be performed until the center of a cell clearly overlies the object. Once such a condition has been achieved, the user can select the cell, the system can identify the object, and the user can input a command requesting a particular action to be performed on the object, such as picking up and moving the object.

In the following disclosure, various specific embodiments are described. It is to be understood that those embodiments are example implementations of the disclosed inventions and that alternative embodiments are possible. All such embodiments are intended to fall within the scope of this disclosure.

Disclosed herein is work on a novel computer-vision-based BCI system that is configured to select an object from a scene image and then perform an action on it. One goal of the system is to perform activity of daily living (ADL) task with the least number of user commands. This reduces the cognitive load on the user as well as reduces the time taken to complete the task.

One of the major contributions of the work described in this disclosure is the ability of the interface to select a novel object from a scene image. In traditional graphical user interfaces (GUIs), the user can point to the object using a mouse pointer or similar pointing device and use a segmentation algorithm to segment the object from the background. However, this can be difficult when using a BCI based on the P300 paradigm because the user must select from among a set of given discrete options. The challenge is to implement a system that enables a user to select an object of interest, which could be located at any pixel coordinates within the image.

A grid-based design is proposed as a solution to the problem described above. According to this design, a scene image is taken from a camera, which can be mounted on the robot platform. This image is overlaid with an m×n stimuli grid for stimulus presentation (see FIG. 4). Each cell in this grid represents an individual stimulus. At the center of each cell in the grid is a "seed point," which can be displayed to the user as a small dot. Selecting a cell in the grid is treated as if the user selected the seed point pixel. This seed point is used for segmenting the object of interest from the image. Thus, the user conveys his or her intention to select an object by selecting a cell, whose seed point overlies the object of interest. Any pixel location in the scene image can be selected using this method by recursively zooming into subregions of the image and then creating a new grid on that subregion.

In real-world environments, an object can be located anywhere and the user must be able to select that object. Using a uniform, fixed-size grid would require multiple zoom operations to select an object that might be at any location on the image. This would require the user to issue multiple commands through the BCI system, which makes the selection process slower and adds more fatigue to the user. To improve upon the efficiency of selecting an object with the least amount of commands, a non-uniform dynamically sized grid is used, which is constructed using an intelligent grid division algorithm. The algorithm uses computer-vision techniques to increase the likelihood of the edges of grid coinciding with the boundaries of the objects in the image, thus making it more likely for the seed points to overlie the object of interest.

In traditional P300-based BCI systems, stimuli are presented in groups to reduce presentation time. Usually a row-column method is used, where cells are arranged in a two-dimensional matrix in which each row and each column is presented as a group. For a grid of (m×n) dimensions, (m+n) groups can be displayed instead of (m·n) individual elements, thus reducing the time required for stimulus presentation. The selected cell is considered to be the one at the intersection of the row and the column with the highest P300 classification scores. This basic row-column method works well for programs such as the P300 speller, in which the elements can be neatly arranged in rows and columns on the display. However, because of adaptive grid lines, the disclosed interface comprises a grid whose dimensions (number of cells in the grid as well as cell size) change dynamically. Therefore, a modified, randomized version of the row-column paradigm has been implemented. In this method, based on the number of active cells on the screen, a look-up table is used to determine the matrix size (m×n) to be used. If the number of active cells is less than (m×n), then dummy cells are added to fill the matrix. These dummy cells can be run behind the scene to complete the rows and columns. In order to create a random pattern, another (m×n) matrix can be created, which is used as an index into the cell matrix. This index is randomly shuffled. Rows and columns from this index matrix are chosen as groups. Because this index matrix is randomized, the indices will point to random locations in the cell matrix, thus appearing to the user as random. This arrangement also ensures that the intersection of the set of cells in any two cell groups will have just one cell, enabling one to choose the selected cell as described previously in the row-column method.

The seed point is used to segment the object of interest from background regions in the scene image. In some embodiments, a color-based flood-filling algorithm can be used to segment the object. When flood-filling is performed, edge information is used as a boundary mask for the flood-filling algorithm. For identification, color-based matching can be used to compare the segmented object against several objects in a database.

Once an object is selected and identified, a custom menu can be displayed to the user containing actions that can be performed on that particular object. An example of such an action is grasping the identified object. When a grasp command is issued, the location of the identified object is retrieved from the database and a trajectory is generated from the current end-effector pose to the object grasping pose. A resolved-rate algorithm can be used to perform inverse kinematics for arm motion. In such a case, wheelchair motion is not necessary. The robotic arm then grasps the object and brings it to a position closer to the user. In order to enable grasping of objects with unknown pose, the object pose can be estimated using a depth-based camera such as the Microsoft Kinect®.

Figure 1:
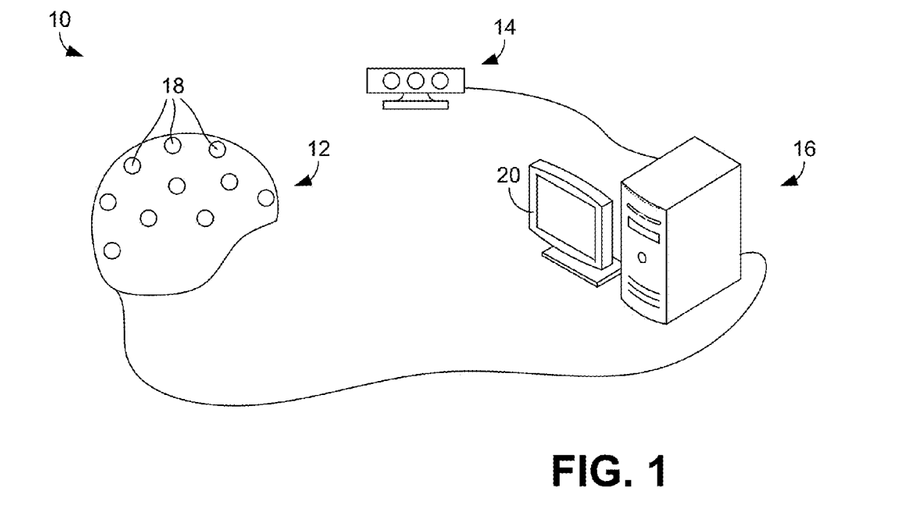
FIG. 1 is a block diagram of an embodiment of a brain-computer interface system that can be used to assist a user in performing an activity of daily life.

FIG. 1 illustrates an example BCI system 10 that can be used to provide the above-described functionality. As is shown in the figure, the system 10 generally includes a user interface 12, a camera 14, and a computing device 16. A robotic manipulator, such as a robotic arm, that can be used to perform a determined action on an object is not shown in the figure. The user interface 12 comprises a cap that can be worn on the head of the user, such as a locked-in patient. Multiple electrodes 18 are provided on the cap that can be used to detect brain waves in the form of electrical signals.

The camera 14 can comprise a three-dimensional camera that is adapted to capture images of a scene and further to determine the depths of objects within the scene. An example of such a camera is the Microsoft Kinect® camera. In alternative embodiments, the camera 14 can comprise a standard two-dimensional camera.

Figure 2:
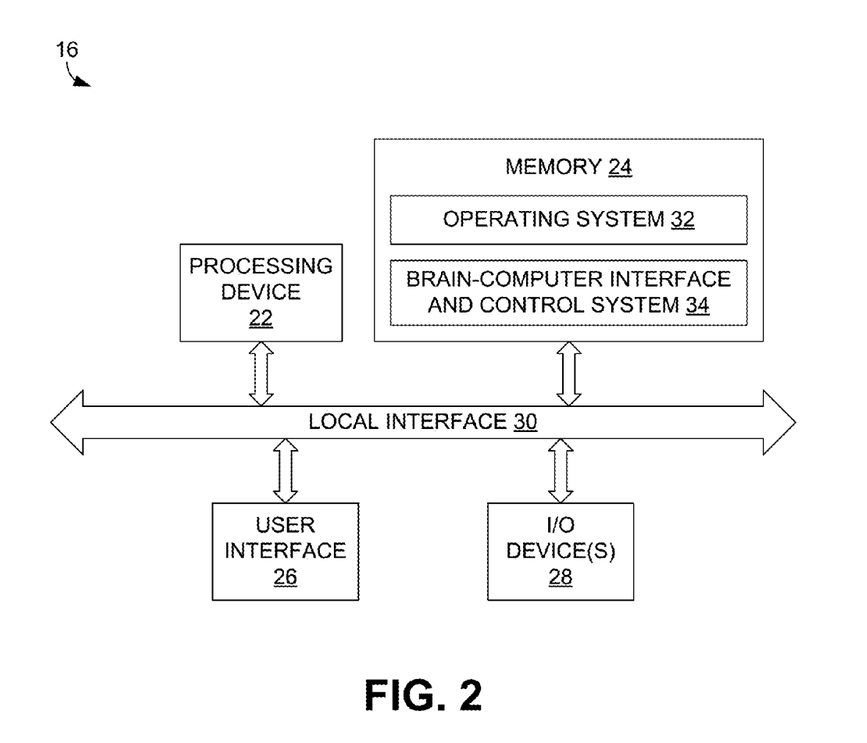
FIG. 2 is a block diagram of an embodiment of a computing device shown in FIG. 1.

The computing device 16 can, for example, comprise a conventional a desktop computer that includes a display 20 that can be used to present a GUI to the user of the system 10. FIG. 2 illustrates an example configuration for the computing device 16. As shown in FIG. 2, the computing device 16 can generally include a processing device 22, memory 24, a user interface 26, and at least one I/O device 28, each of which is connected to a local interface 30. The processing device 22 can include a central processing unit (CPU) or a semiconductor-based microprocessor (in the form of a microchip). The memory 24 includes any one of or a combination of volatile memory elements (e.g., RAM) and nonvolatile memory elements (e.g., hard disk, ROM, Flash, etc.). The user interface 26 comprises the components with which a user interacts with the computing device 16, such as a keyboard, keypad, and a display such as that shown in FIG. 9. The I/O devices 28 are adapted to facilitate communications with other devices.

The memory 24 (a non-transitory computer-readable medium) comprises programs (logic) including an operating system 32 and a brain-computer interface and control system 34. The brain-computer interface and control system 34 is configured to generate GUIs for the user and to perform actions based upon the user's brain responses while viewing the GUIs. In some embodiments, brain-computer interface and control system 34 comprises the intelligent grid division algorithm described above.

Figure 3A:
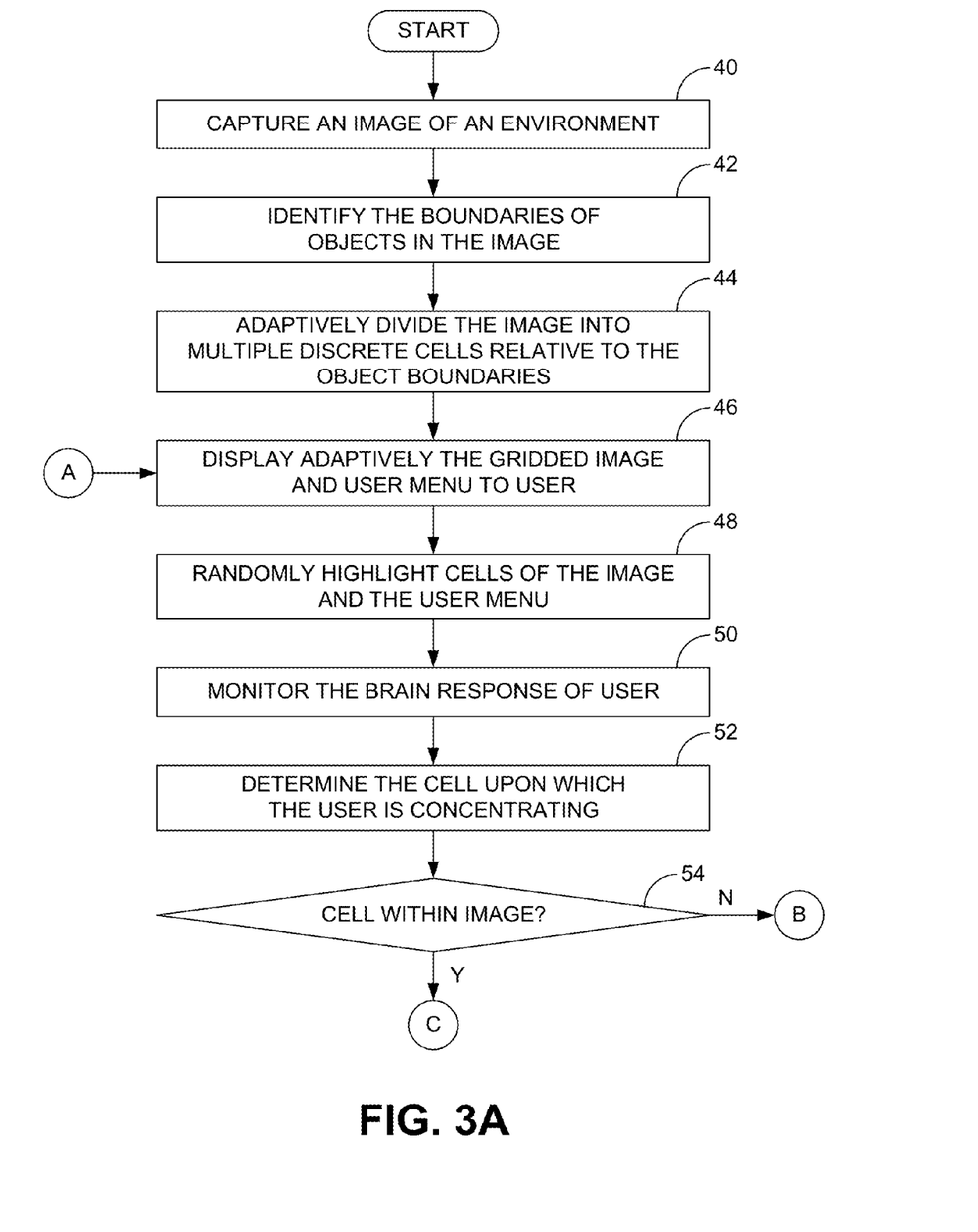
FIGS. 3A-3C together form a flow diagram of an embodiment of a method for assisting a user in performing an activity of daily life.

FIG. 3 describes an example method for performing actions in response to detected brain responses using a BCI system. In some embodiments, the method can be performed by the system 10 illustrated in FIG. 1. Beginning with block 40 of FIG. 3A, an image is captured of an environment (scene) that contains an object on which the user would like an action to be performed. In some embodiments, the image can be captured with a camera that is configured to sense the distance of objects within the scene to facilitate performing actions on the object.

Referring next to block 42, the boundaries of objects within the image are identified. This identification can be performed based upon features of the scene that are detected using one or more computer-vision techniques. In some embodiments, edge detection can be performed on the image to identify the boundaries of the objects. For example, the Canny edge detector can be used to perform edge detection on the image, which outputs a binary edge image in which each pixel value is "1" if it is an edge pixel and "0" if not. This edge data is used as a probabilistic heuristic for object boundaries in the image. In other embodiments, a depth image taken from a depth sensor is used to identify the object boundaries in the scene. Each pixel in such a depth image corresponds to the distance from the sensor to the measured point. Therefore, sharp changes in adjacent pixels in the depth image correspond to object boundaries in the scene image. Depth image data can, for example, first be normalized to values between 0 and 255. Then, an edge detection algorithm, such as the Canny edge detector, can be used on this normalized depth image and the object boundaries can be identified.

With reference next to block 44, the image is adaptively divided into multiple discrete cells relative to the object boundaries. In some embodiments, the image is divided into a grid that is composed of multiple rows and columns wherein each cell lies at the intersection of a row and column. Positioned at the center of each cell is a center marker (e.g., dot) that acts as the seed point that can be positioned over an object within the image upon which an action is to be performed. As described above, the rows and columns can be of non-uniform heights and widths, respectively, because the grid is formed to maximize the alignment of the edges of the rows/columns with the boundaries of objects within the image. As described above, doing this increases the likelihood of a seed point overlying a particular object upon which the user wishes an action to be performed, which increases the speed of the object selection process.

Figure 4:
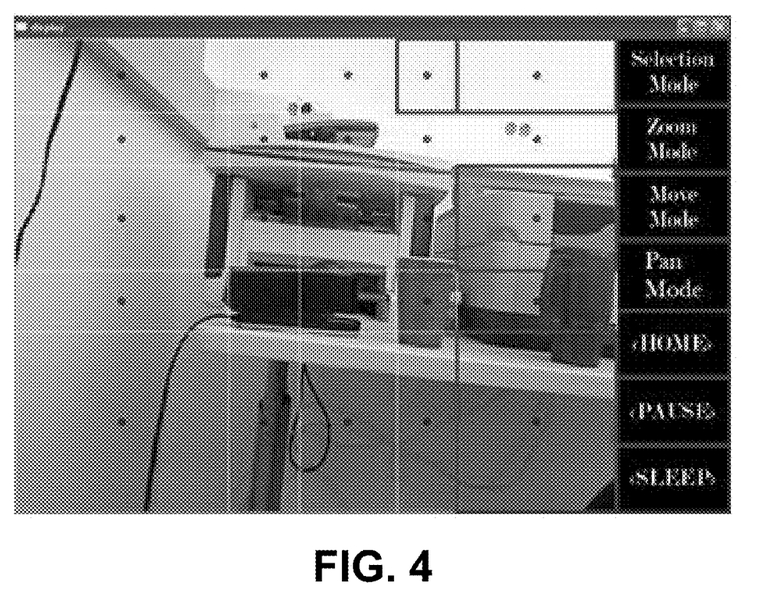
FIG. 4 is a first example of a graphical user interface of a brain-computer interface shown to a user.
Figure 5:
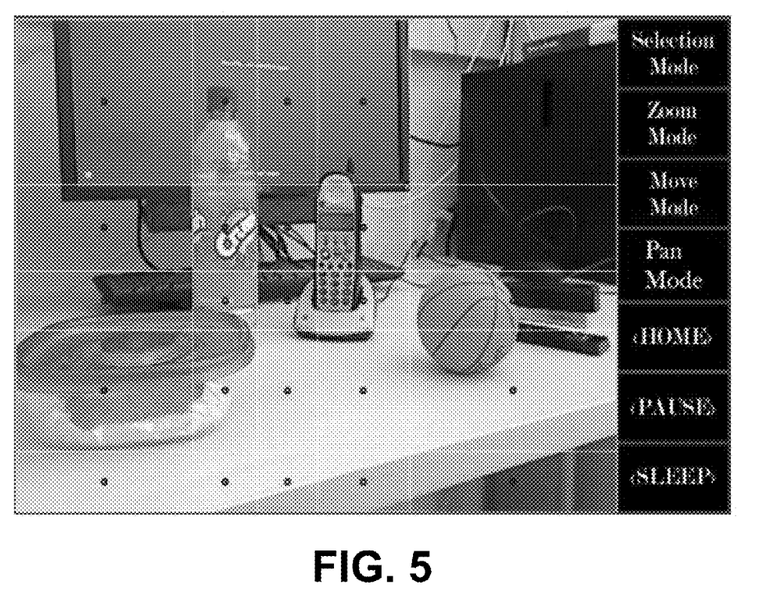
FIG. 5 is a second example of a graphical user interface of a brain-computer interface shown to a user.

FIGS. 4 and 5 illustrate two examples of images to which a non-uniform grid has been applied. In both figures, a 5×5 grid matrix was used. Notably, the grid can have greater or fewer rows and/or columns. Generally speaking, large grid sizes cause longer presentation times and increase fatigue on the user, whereas small grid sizes may require multiple zooms, which also increases time to select an object. As can be appreciated in FIGS. 4 and 5, each grid is uniquely adapted to align with the objects within the image. For example, in FIG. 4, the edges of a column of the grid generally align with the left and right edges of a cup within the displayed scene and a row of the grid generally aligns with the top and bottom edges of the cup. In FIG. 5, the edges of a column of the grid generally align with the left and right edges of a bottle within the displayed scene. This type of adaptation of the grid to objects in the scene results in a grid having non-uniform rows and columns. Specifically, the heights of the rows and width of the columns are not equal. Instead, their dimensions are dictated by the locations of the boundaries of the object within the scene. To determine where to draw the vertical lines of a grid, for each column $C_i$ in the edge image, the number of edge-pixels $N(C_i)$ in that column is calculated. Then the columns with highest edge-pixel counts are chosen while maintaining a minimum separation between the lines. The horizontal grid lines are chosen similarly.

With reference back to FIG. 3A, the adaptively gridded image is displayed to the user along with a user menu, which is also divided into multiple cells, each menu cell being associated with a different user command, as indicated in block 46. Examples of the user menu are also shown in FIGS. 4 and 5. In both figures, the menus include multiple selectable commands. In the example of FIGS. 4 and 5, these commands include "selection mode," "zoom mode," "move mode," "pan mode," "home," "pause," and "sleep." Unlike the cells of the image, the cells for the commands can be of uniform size.

At this point, the various displayed cells are randomly highlighted, as indicated in block 48 of FIG. 3A. In some embodiments, groups of cells are simultaneously highlighted. For example, all of the cells of a given row or column can be simultaneously highlighted. Alternatively, random groups of cells in multiple rows and/or columns can be simultaneously highlighted. Regardless of how the cells are grouped, the cells can be highlighted by changing the background color of the cells, changing the color of the boundaries of the cells, changing the color of a portion (e.g., a central portion) of the cells, changing the brightness of the cells, or otherwise visually altering the cells so as to distinguish them from non-highlighted cells.

As the cells are highlighted, the user concentrates on the cell that coincides with the object upon which he or she wishes an action to be performed. In situations in which the object extends across multiple cells, the user can concentrate on the cell in which the largest portion of the object lies. In some embodiments, the user can maintain his or her concentration on the cell by counting the number of times the cell is highlighted. As the user does this, the user's brain response is monitored, as indicated in block 50. Through such monitoring, the cell upon which the user is concentrating can be determined, as indicated in block 52.

At this point, flow depends on whether the cell upon which the user was concentrating was within the image or within the user menu, as indicated in decision block 54. For the purposes of this example, it is assumed that none of the cells' center markers overlie the object of interest. Accordingly, the user may wish to zoom the image to enable a new adaptive grid to be formed with the hope that the center marker of one of the new cells will overlie the object. In such a case, the user can select the "zoom" command, in which case the cell upon which the user was concentrating is in the user menu (and therefore not within the image). Flow therefore continues to block 56 of FIG. 3B.

Figure 3B:
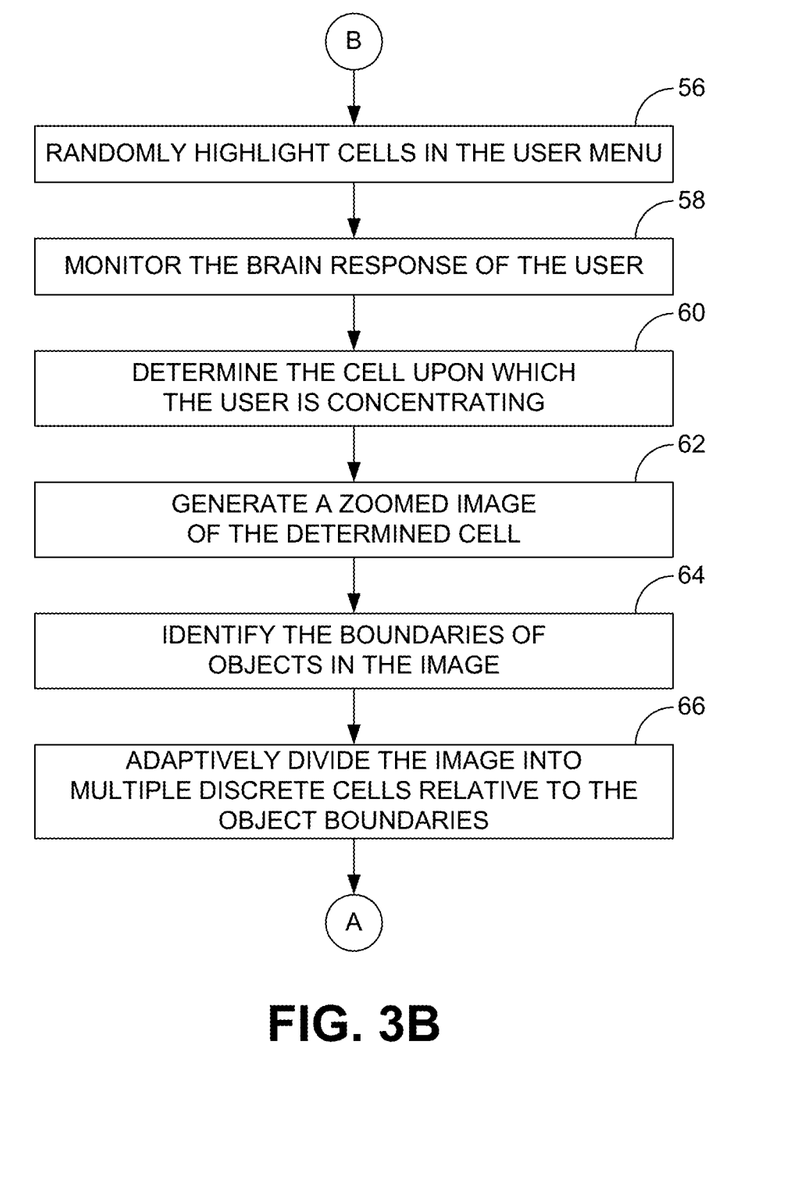

In the case of the "zoom" command having been selected, cells of the image are again randomly highlighted (block 56), the user's brain response is monitored (block 58), and the cell within the image upon which the user is concentrating is determined (60). Once this cell has been identified, a zoomed image of that cell can be generated, as indicated in block 62. More particularly, the cell upon which the user was concentrating can be expanded and used as a new image to be adaptively divided. As before, the boundaries of the objects in the new image can be identified (block 64) and the image can be adaptively divided into multiple discrete cells relative to the object boundaries (block 66), which will be different (e.g., differently sized) from the cells of the original (non-zoomed) image.

At this point, the flow is similar to that described above when the original image was displayed to the user. Therefore, with reference back to FIG. 3A, the adaptively gridded image can be displayed to the user along with the user menu (block 48), the brain response of the user can be monitored (block 50), and the cell upon which the user is concentrating can be determined (block 52).

Referring to decision block 54 of FIG. 3A, flow again depends upon whether the determined cell is within the image or within the user menu. If the cell is again within the user menu, and assuming again that the cell is associated with the "zoom" command, flow again proceeds to block 56 of FIG. 3B at which a further zoomed image is presented to the user. Assuming, however, that this time the cell is within the image and the center marker of the cell overlies the object of interest, flow continues to block 68 of FIG. 3C at which the cell is selected.

Figure 3C:
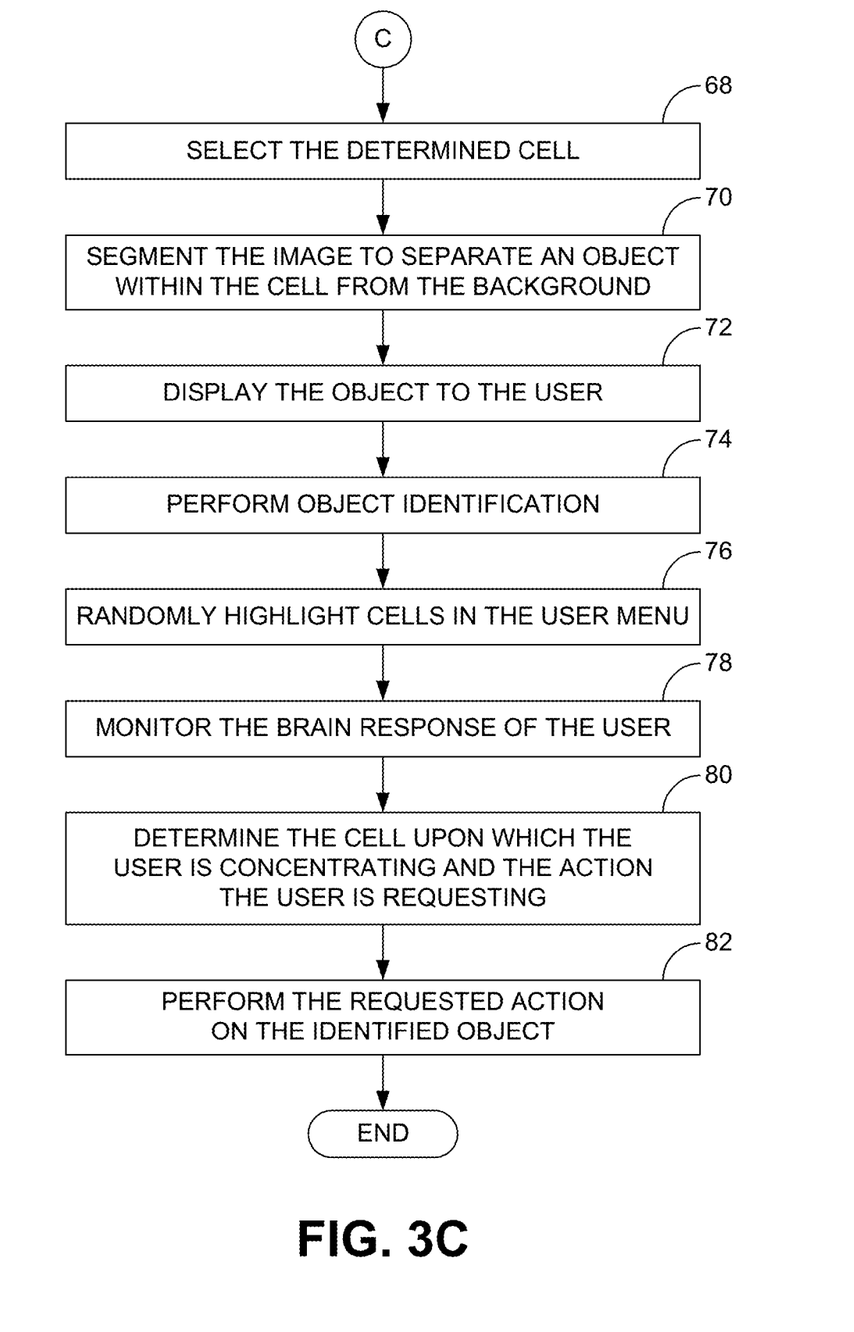
Figure 6:
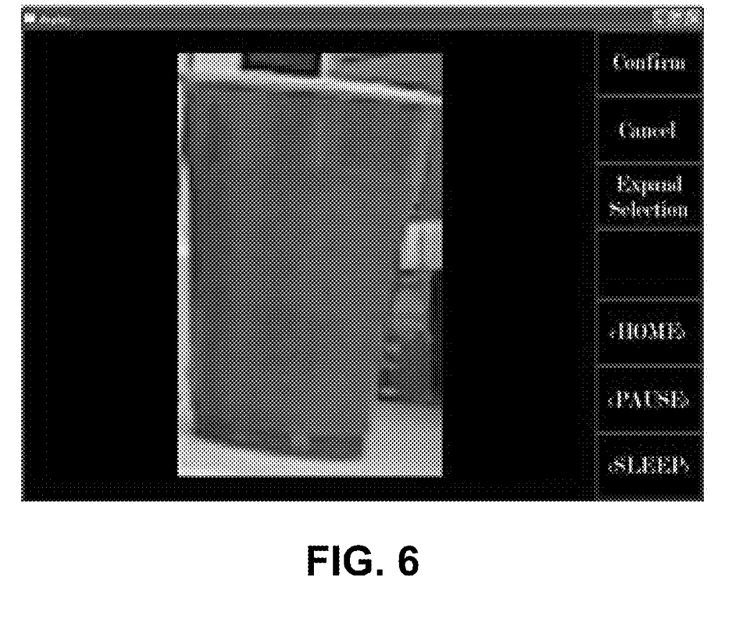
FIG. 6 is a third example of a graphical user interface of a brain-computer interface shown to a user.

Once the cell has been selected, the image is segmented so as to separate the object with the cell from the remainder of the image, as indicated in block 70. In some embodiments, this segmentation can be performed using a flood-filling algorithm, a scale-invariant feature transform (SIFT) algorithm, or a speeded-up robust features (SURF) algorithm. In addition, a close-up image of the object can be displayed to the user, as indicated in block 72, to communicate to the user what the system has determined to be the object of interest. FIG. 6 shows as example of such an image, which includes the cup shown in the image of FIG. 1.

Once the object of interest has been determined, the system can perform object identification to identify the type of object the object of interest is, as indicated in block 74. Feature points calculated from two-dimensional image data, as well as three-dimensional point cloud data, can be used to identify the object from a database of known objects. If no identifications are made, the general category of the object can be determined from the three-dimensional point cloud data based on the object's three-dimensional shape. In some embodiments, the actions that can be performed on the object of interest will depend upon the type of object the object of interest is. Accordingly, the commands that will be next presented to the user in the user menu can be customized to reflect the object type. Regardless, the appropriate user menu can be presented to the user and the cells of the user menu can be highlighted (block 76), the user's brain response can be monitored (block 78), and the cell upon which the user is concentrating can be determined (block 80). Assuming that the menu cell upon which the user is concentrating is associated with a particular action that the user wishes to be performed on the object, determination of the menu cell upon which the user is concentrating is a determination of this action. Next, with reference to block 82, the requested action can be performed on the identified object. A variety of actions can be performed. In some embodiments, the action can be one or more of picking up an object, moving an object, placing an object in a particular location (e.g., the trash), opening a door (when the object is a door knob), etc.

From the above-described flow diagram, it can be appreciated that the system can be used to dynamically and adaptively generate grids that facilitate the rapid selection of an object upon which the user wishes an action to be performed. Instead of using a uniform grid of uniform row height and column width and requiring the user to repeatedly zoom in until the seed point ultimately overlies the object of interest, grids that are dynamically customized for the objects within the viewed scene are displayed that significantly reduce the required number of zoom operations and, therefore, significantly reduce the amount of time and effort required from the user to select an object.

Experiments were performed to test the effectiveness of the above-described system and methodology. The testbed comprised a nine degree-of-freedom (DOF) wheelchair-mounted robotic arm (WMRA) system interfaced to the BCI system. The WMRA comprises a seven-DOF arm and a two-DOF wheelchair to which the arm is attached. The arm was developed at the Center for Assistive, Rehabilitation and Robotics Technologies (CARRT) at the University of South Florida (USF) and comprised an assembly of electric motors and harmonic drives. The WMRA system has optimized trajectory control based on singularity avoidance and other optimization functions. For the experiments, the seven DOFs of the arm were used but the mobility of the wheelchair was not. A variety of input control devices can be interfaced with the WMRA for autonomous and teleportation motion, including the BCI. The BCI system comprised an eight-channel electrode cap, a g-tec USBAmp-8 biological signal amplifier box, and a signal processing module for detecting the P300 response. Electroencephalography (EEG) signals captured by the cap are sent to the amplifier box for filtering and conditioning and are then transferred to the signal processing module for analysis and processing. The input signal was sampled at 256 Hz. The signal was band-pass filtered between 0.5 Hz to 30 Hz and then passed through a notch filter to remove 58 Hz to 62 Hz components (power line noise). For stimulus presentation, stimulus-on-time was set to 250 ms and the inter-stimulus-interval was randomized to be between 50 ms to 100 ms. Epoch length was set to 500 ms for P300 detection.

Figure 7:
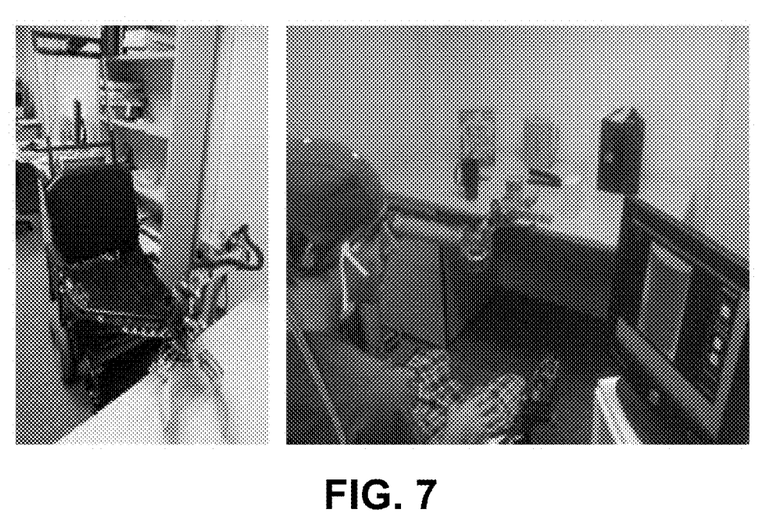
FIG. 7 is an image of a wheelchair-mounted robotic arm system and testbed used during performed experiments.
Figure 8:
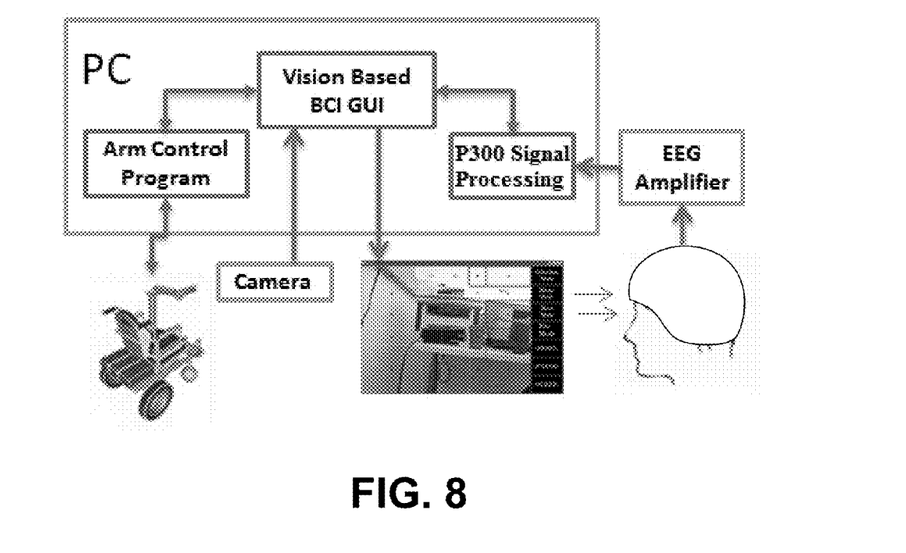
FIG. 8 is a block diagram of an embodiment of the brain-computer interface and wheelchair-mounted robotic arm system used in the experiments.
Figure 9:
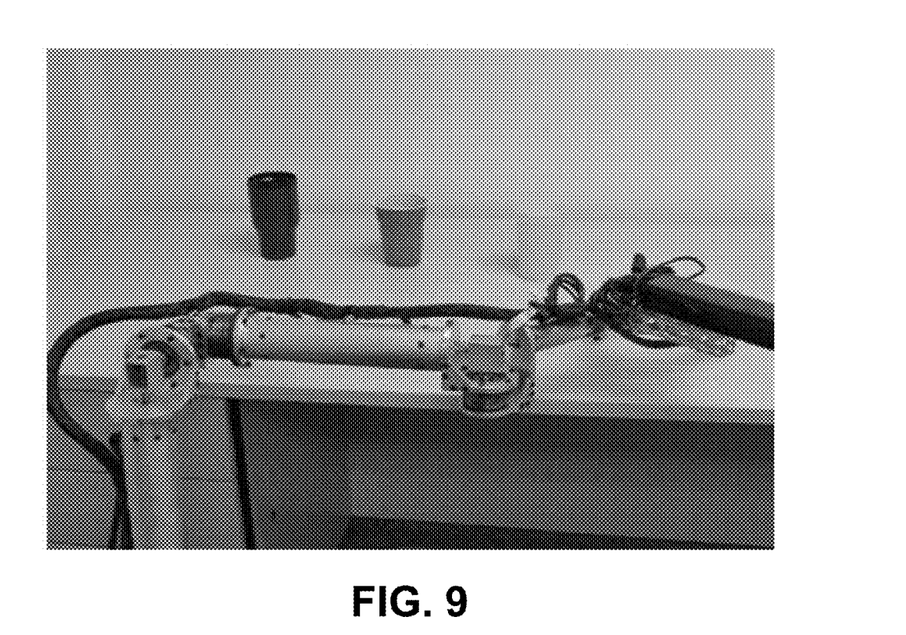
FIG. 9 is an image of the test environment used in the experiments.

A monocular lens RGB Logitech webcam was mounted on a frame attached to the WMRA on a bracket above the user's head to capture the scene of the environment, which was overlaid with a flashing grid and displayed on a monitor. The vision program, arm control program, and signal processing module communicated via UDP sockets. They were both run on the same personal computer (PC). FIG. 7 shows the actual testbed and FIG. 8 shows the schematic of the experimental system. The environment used for testing, with its multiple objects, is shown in FIG. 9.

The BCI system can to be calibrated for each user to improve its accuracy. Training the BCI system involves determining participant-specific linear classifier weights. Training data was collected for each participant in the form of raw EEG signals and stimulus timing information. Each participant was asked to spell two five-letter words in two runs of the speller and each sequence was repeated five times. An offline analysis tool was used to perform stepwise linear discriminant analysis (SWLDA) on this data and to generate individualized feature weights for the P300 classifier. These were later loaded for each participant as customized classifier weights to be used in the new vision-based BCI interface.

The system was tested on six able-bodied subjects. There were five males and one female aged 24 to 40 years. The average accuracy of the intention detection per subject and the average number of commands it takes per subject to grasp an object were determined as metrics to validate the system. The accuracy was measured as the percentage of times the system detected the correct cell that the user intended from the flashing grid. None of the subjects had earlier experience using or testing on a BCI system. The subjects gained familiarity with the BCI P300 system during the training stage, which lasted 15 to 20 minutes. After the training stage, the subjects were asked to spell two more words to determine their accuracy on the P300 speller. This accuracy was used as a baseline to compare the accuracy of the system. The environment comprised three cups (blue, yellow, and red) placed on a table (see FIG. 9). The subjects were asked to pick up all three cups using the BCI interface. Picking up a cup involved the subject issuing multiple commands (selections) via the BCI. The theoretical minimum number of commands necessary for selecting an object and performing an action on it was two, which is the case when no zooming is required.

Figure 10:
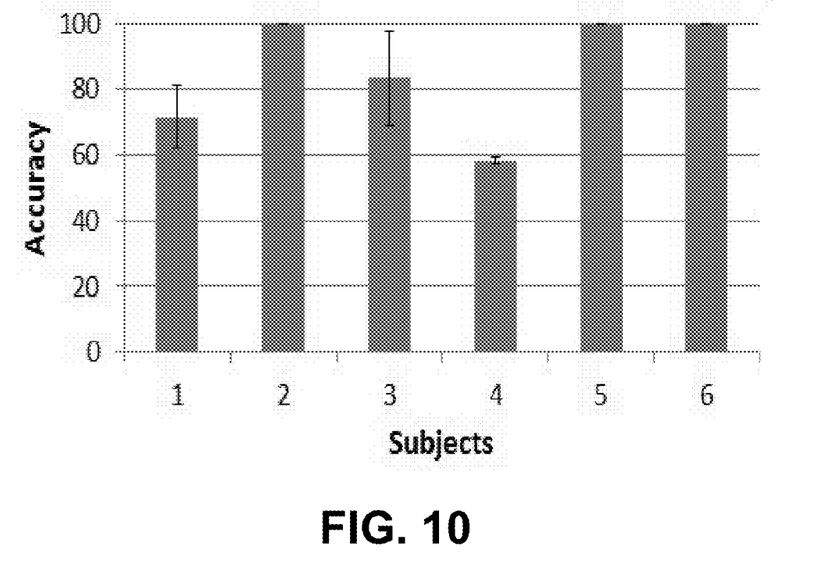
FIG. 10 is a graph that illustrates the accuracy of the experimental system in detecting the test subject's intentions.
Figure 11:
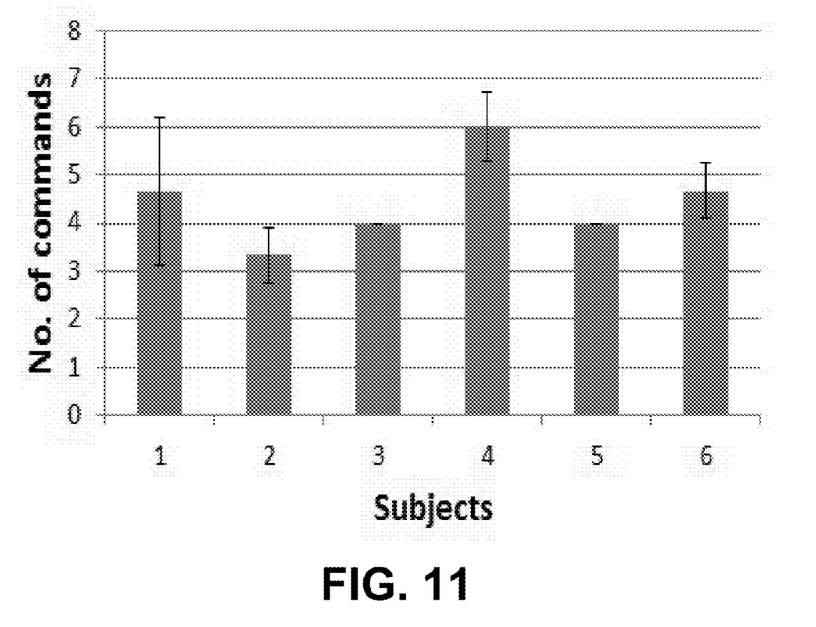
FIG. 11 is a graph that illustrates the average number of commands entered per test subject per task during the experiments.

FIG. 10 shows the accuracy of the system in detecting subjects' intentions. For each subject, the accuracy is the average number of correct stimuli detected by the system in grasping the three cups. FIG. 11 shows the average number of commands it took for the subject to grasp an object. As one can see from FIG. 10, 100% accuracy was obtained for three out of six subjects. All of the subjects were able to pick up all the three cups, except Subject 4 who failed to pick up the yellow cup within 10 selections. It is believed that excessive fatigue was the cause for this failure. The accuracy averaged over all the subjects was found to be 85.56%. With the P300 speller application, it was determined that the users reached an average accuracy of 93.33%. It was observed that subjects who achieved good accuracy levels in the P300 speller achieved better accuracy in the system as well. It was also found that the subjects took an average of five commands to grasp an object. The time to complete a task was proportional to the number of commands issued.

During testing, it was observed that there was a drop in the accuracy that occurred with all the subjects after they had tested with the first two objects. It is hypothesized that this drop may have occurred because of the subjects experiencing fatigue. This may have been because the subjects had to maintain high concentration for long periods of time. Some subjects mentioned that they were fatigued. This is a drawback of P300-based BCI applications because they require the user to actively attend to the presentation sequences for considerable amounts of time. The subjects were given a fifteen-minute break between the second and third cup trials and then resumed the testing. It was observed that, after resting, the subjects were able to achieve accuracy similar to that obtained during the testing for the first two objects.

In the testing, it was also observed that accuracy dropped when the flashing sequence was such that two neighboring cells flashed simultaneously, one of them being the cell of interest. It is believed that this flashing diverted the attention of the subjects from the cell of interest and resulted in wrong cell selection by the BCI.

The electrode impedances were an important factor in accuracy as well. It was observed that when the subjects had high impedance values at the electrode interface, the accuracy was low. When the impedance was less than 20 kΩ, however, good accuracy was achieved.

The adaptive grid performed well in enabling object selection with minimum amount of zooming. During the tests, only one instance was observed in which a subject had to zoom twice in order to get the seed point to overlie the desired object.

For each presentation sequence of the GUI, the subject selected a cell using the BCI. For a complete task, a number of such selections are necessary. There is a certain accuracy associated with the selection of each cell. The total accuracy of the task is therefore the product of the accuracy of each selection. This value decreases as the number of sequences in a task increases.

Accuracy depends on a number of factors, such as mental fatigue level of each subject, their ability to concentrate, and external auditory and visual disturbances from the surrounding environment. The amount of training for each subject, ideal number of sequences that lead to the correct detection, and stimulus intensification method also affect the accuracy of the system.

The invention claimed is:

1. A method for assisting a user in performing an action in relation to an object of interest, the method comprising:
    capturing an image of an environment;
    identifying boundaries of objects within the image;
    adaptively dividing the image into a grid of selectable cells having rows and columns so that edges of the rows and columns generally align with boundaries of objects within the image;
    displaying the gridded image to the user; and
    detecting selection of one of the cells by the user, the cell encompassing at least part of the object of interest.

2. The method of claim 1, wherein capturing an image comprises capturing an image with a two-dimensional camera.

3. The method of claim 1, wherein capturing an image comprises capturing an image with a three-dimensional camera that is configured to determine the depths of objects within the image.

4. The method of claim 1, wherein the heights of the rows and the widths of the columns are determined by the locations of the boundaries of the objects within the image such that the heights and widths do not have uniform dimensions.

5. The method of claim 4, wherein each cell of the grid comprises a center marker that acts as a seed point for the cell.

6. The method of claim 1, wherein detecting selection of one of the cells comprises randomly highlighting the cells and monitoring a brain response of the user to determine the cell upon which the user is concentrating.

7. The method of claim 1, further comprising:
    zooming in on the cell selected by the user to form a zoomed image;
    identifying boundaries of objects within the zoomed image;
    adaptively dividing the image into selectable cells so that edges of the cells generally align with boundaries of objects within the image; and
    detecting selection of one of the cells by the user.

8. The method of claim 1, further comprising segmenting the selected cell to separate the object of interest from its background.

9. The method of claim 8, further comprising performing object identification on the object of interest.

10. The method of claim 9, further comprising determining an action that the user wishes to be performed on the object of interest and performing that action on the object of interest.

11. A non-transitory computer-readable medium that stores a brain-computer interface and control system, comprising:
    logic configured to identify boundaries of objects within an image;
    logic configured to adaptively divide the image into a grid of selectable cells having rows and columns, edges of the rows and columns generally aligning with boundaries of objects within the image;
    logic configured to display the gridded image to the user; and
    logic configured to detect selection of a cell by the user, the cell encompassing at least part of an object of interest upon which the user wishes an action to be performed.

12. The computer-readable medium of claim 11, wherein the heights of the rows and the widths of the columns are determined by the locations of the boundaries of the objects within the image such that the heights and widths do not have uniform dimensions.

13. The computer-readable medium of claim 11, wherein the logic configured to detect selection of a cell comprises logic configured to randomly highlight cells and monitor a brain response of the user to determine the cell upon which the user is concentrating.

14. The computer-readable medium of claim 11, further comprising logic configured to zoom in on a selected cell to create a zoomed image to enable adaptive dividing of the zoomed image.

15. The computer-readable medium of claim 11, further comprising logic configured to segment a selected cell to separate the object of interest from its background.

16. The computer-readable medium of claim 11, further comprising logic configured to perform object identification on the object of interest.

17. The computer-readable medium of claim 11, further comprising logic configured to determine an action that the user wishes to be performed on the object of interest and logic configured to control performance of that action on the object of interest.

18. A brain-computer interface system comprising:
 a user interface including electrodes configured to detect brain waves;
 a camera configured to capture an image of an environment that includes an object of interest upon which a user wishes an action to be performed; and
 a computing device that executes:
  logic configured to identify boundaries of objects within the image;
  logic configured to adaptively divide the image into a grid of selectable cells having rows and columns so that edges of the rows and columns generally align with boundaries of objects within the image;
  logic configured to display the gridded image to the user; and
  logic configured to detect selection of a cell by the user, the cell encompassing at least part of the object of interest.

19. The system of claim 18, wherein the heights of the rows and the widths of the columns are determined by the locations of the boundaries of the objects within the image such that the heights and widths do not have uniform dimensions.

20. The system of claim 18, wherein the computing device further executes logic configured to zoom in on a selected cell to create a zoomed image to enable adaptive dividing of the zoomed image.

* * * * *